US009239664B2

(12) United States Patent
Werner

(10) Patent No.: US 9,239,664 B2
(45) Date of Patent: Jan. 19, 2016

(54) METHOD AND SYSTEM FOR USING A TABLET DEVICE TO PROVIDE CONTEXTUAL INPUT TO A COMPUTING DEVICE

(75) Inventor: Horst Werner, Muehlhausen-Rettigheim (DE)

(73) Assignee: SAP SE, Walldorf (DE)

( * ) Notice: Subject to any disclaimer, the term of this patent is extended or adjusted under 35 U.S.C. 154(b) by 355 days.

(21) Appl. No.: 13/598,126

(22) Filed: Aug. 29, 2012

(65) Prior Publication Data

US 2014/0062894 A1    Mar. 6, 2014

(51) Int. Cl.
*G06F 3/0482* (2013.01)
*G06F 3/0488* (2013.01)

(52) U.S. Cl.
CPC ............ *G06F 3/0482* (2013.01); *G06F 3/0488* (2013.01); *G06F 2203/04803* (2013.01)

(58) Field of Classification Search
CPC .................. H04N 21/42207; H04N 21/42224; H04N 21/43615; A63F 2300/301; G09B 5/08
USPC ........... 715/736, 740; 345/173, 156; 709/227; 725/116
See application file for complete search history.

(56) References Cited

U.S. PATENT DOCUMENTS

| 8,269,719 B1* | 9/2012 | Kim ............................... 345/156 |
| 2010/0251181 A1* | 9/2010 | Lal ................................ 715/834 |
| 2012/0214416 A1* | 8/2012 | Kent et al. .................... 455/41.2 |
| 2013/0132852 A1* | 5/2013 | Sommer ....................... 715/736 |

OTHER PUBLICATIONS

"ROCCAT Power-Grid Interview Q&A", [Online]. Retrieved from the Internet: <URL: http://www.gadgetreview.com/2012/03/roccat-power-grid-interview-qa.html>, (Mar. 22, 2012), 7 pgs.
"Tablet computer", Wikipedia® , [Online]. Retrieved from the Internet: <URL: http://en.wikipedia.org/wiki/Tablet_computer>, (Accessed Jun. 22, 2012), 16 pgs.
"Touchscreen", Wikipedia® , [Online]. Retrieved from the Internet: <URL: http://en.wikipedia.org/wiki/Touchscreen>, (Accessed Jun. 22, 2012), 10 pgs.
Kennedy, Jason, "ROCCAT Power-Grid Lets You Game in Peace", [Online]. Retrieved from the Internet: <URL: http://www.pcworld.com/printable/article/id.251433/printable.html>, (Mar. 17, 2012), 2 pgs.

* cited by examiner

*Primary Examiner* — Amare Mengistu
*Assistant Examiner* — Shawna Stepp Jones
(74) *Attorney, Agent, or Firm* — Schwegman Lundberg & Woessner, P.A.

(57) ABSTRACT

A tablet device provides contextual input to a computing device by using a touchscreen to display a context menu related to a location on a display screen of the computing device, accessing a selection from the context menu from the touchscreen, and sending values corresponding to the selection to the computing device. The touchscreen may alternatively enable user input related to the context menu or touchpad functions.

23 Claims, 7 Drawing Sheets

METHOD AND SYSTEM FOR USING A TABLET DEVICE TO PROVIDE CONTEXTUAL INPUT TO A COMPUTING DEVICE

BACKGROUND

1. Technical Field

The present disclosure relates generally to computing devices and more particularly to tablet devices.

2. Description of Related Art

Computer display screens frequently include numerous items with related contextual information including choices for processing or modifying the relevant items. For example, contextual choices for a text file may include editing, printing, or deleting the file. However, presenting this information on the display screen without an explicit request by the user may be counterproductive, for example, when other screen items are obscured or when the user is not interested in the relevant options. Alternatively, if this information is only displayed after a user request (e.g., through a secondary mouse button), the user must then interrupt other activities to determine the existence of the information. Thus, there is a need for improved methods and related systems for managing and displaying contextual information related to items on a display screen.

DETAILED DESCRIPTION OF EXAMPLE EMBODIMENTS

Figure 1:
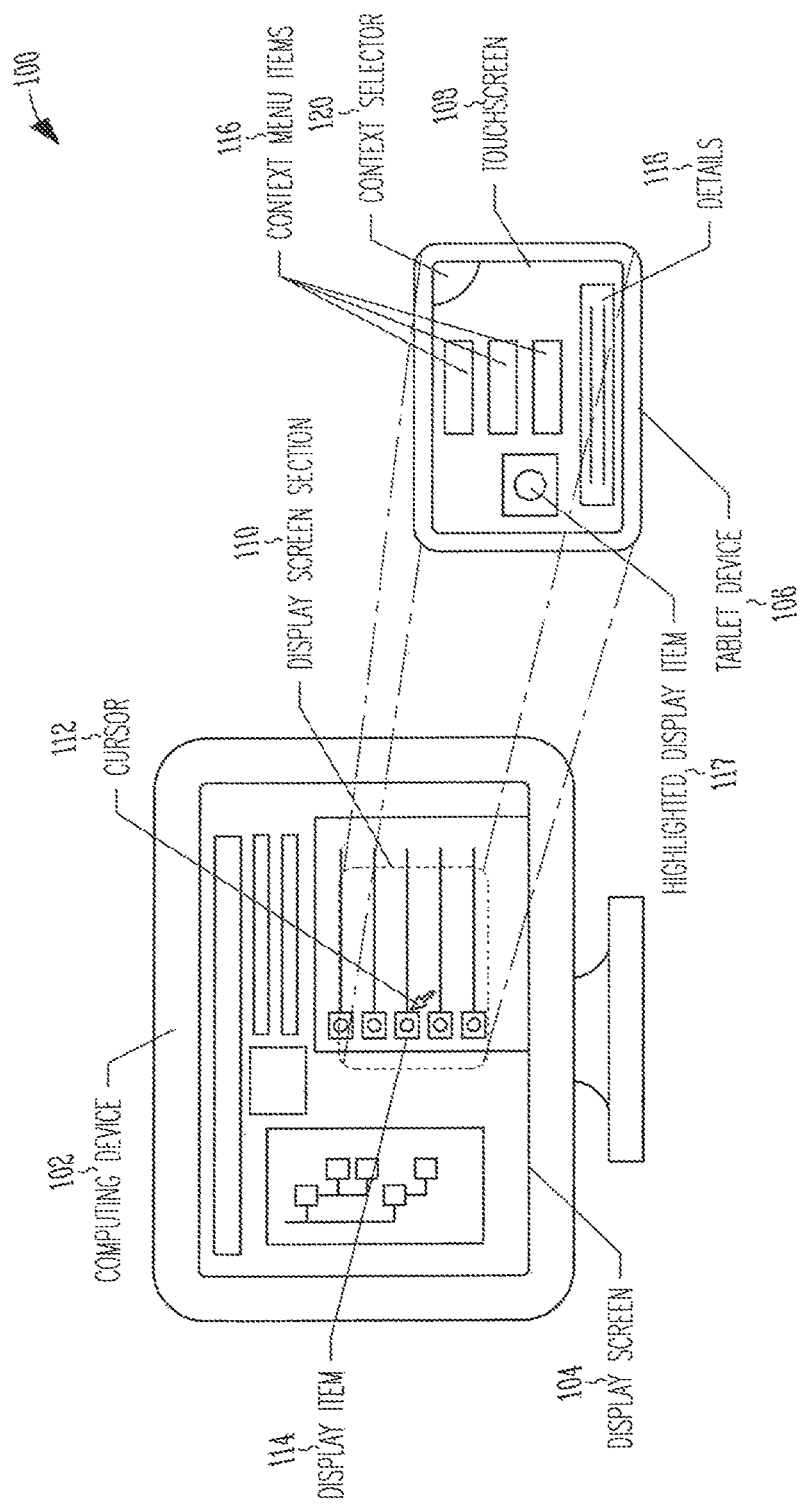
FIG. 1 is a diagram that shows a system related to example embodiments disclosed herein including a computing device and a tablet device.

FIG. 1 is a diagram that shows a system 100 related to example embodiments disclosed herein. The system 100 includes a computing device 102 (e.g., a personal computer (PC)) with a display screen 104 and a tablet device 106 with a touchscreen 108. The computing device 102 and the tablet device 106 each include a processor for performing local operations and maintaining communication between the devices. Typically, the connection between the computing device 102 and the tablet device 106 is a wireless connection where messages can be pushed in either direction without a noticeable delay (e.g., via Bluetooth, WiFi, Near Field Communication (NFC) socket connection, etc). However, wireline connections are also possible. The touchscreen 108 is effectively mapped to a display screen section 110 that is balanced about the position of a cursor 112 on the display screen 104 so that the touchscreen 108 operates like a touchpad and user inputs on the touchscreen 108 control the position of the cursor 112 on the display screen 104. That is, when the touchscreen 108 is touched, the tablet device 106 sends the relative movement of the touch point to the computing device 102, where these coordinates are added to the position of the cursor 112.

At the computing device 102, a display item 114 in the display screen section 110 is identified as having related contextual information for display on the touchscreen 108. For example, the identified display item 114 may be the screen item closest to the cursor 112 with related contextual information and within a threshold distance. In some operational settings the cursor 112 must be touching the identified display item 114. Context menu items 116 corresponding to the display item 114 are then shown on the touchscreen 108. Additional contextual information including imagery and text may be displayed on the touchscreen 108 including a highlighted display item 117 (e.g., from a bitmap image) and descriptive details 118. In addition, an area of me touchscreen 108 is identified as a context selector 120 to indicate that a related selection of one of the context menu items 116 is not a touchpad operation for adjusting the cursor 112.

Figure 2:
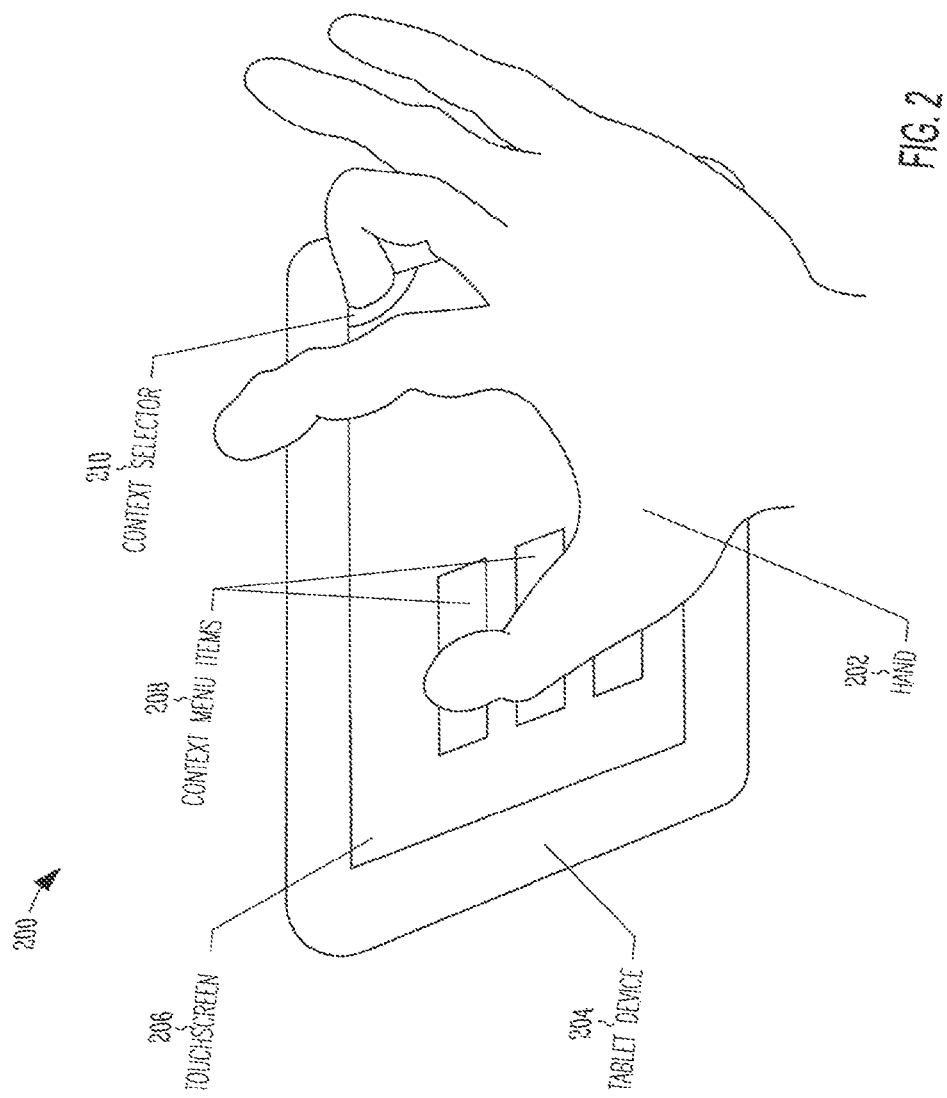
FIG. 2 is a diagram that illustrates operations related to the tablet device of FIG. 1.

For example, FIG. 2 is a diagram 200 that illustrates menu operations for a user's hand 202 with a tablet device 204 that includes a touchscreen 206 with a number of context menu items 208 and a context selector 210. The hand 202 includes five fingers (e.g., digits) conventionally denoted from left to right in FIG. 2 as a thumb, index ringer, middle finger, ring finger and little finger. In FIG. 2 the middle finger of the hand 202 is applied to the context selector 210, and the thumb of the hand 202 is applied to one of the context items 208. Alternative arrangements of the context menu items 208 and the context selector 210 on the touchscreen 206 are possible to facilitate alternative finger operations. For example, the context menu items 208 may be approximately arranged along an arc that is defined about the context selector 210 so that selecting finger (e.g., the thumb of the hand 202) can easily access the choices.

In addition to presenting the context menu items 116 at the touchscreen 108 and receiving related selections from the touchscreen 108, the tablet device 106 may present non-visual signals to a user including sounds and vibrations. For example, the presence and selection of context menu items may be signalled to the user in this way so as not to interrupt the user's attention to the display screen 104.

The interplay between the context menu on the touchscreen 108 and the display screen 104 may be implemented in a variety of ways when the context selector 120 is employed. For example, when the selecting finger slides along the context menu items 116, the user may receive a non-visual signal at the tablet device, and the display screen 104 may show a visual indicator (e.g., a pop-up item) for the menu item currently indicated by the selecting finger. Raising the selecting finger from the current menu item may effect a selection of that menu item and the result may be displayed on the display screen 104. Alternatively, the user may avoid the selection of the current menu item by sliding the selecting finger away from the current menu item.

The specific details of the context menu items 116 typically depend on the nature of the relevant display item 114. As discussed above, contextual choices for a text file may include editing, printing, or deleting the file. When the display item 114 is part of a graphical display (e.g., an organizational chart), the contextual choice may include changing the display features (e.g., color, size) or editing related textual items (e.g., comments, ratings).

In some operational settings, context menus may be applied recursively, for example, when the selection of a context menu item leads to another context menu (e.g., a context sub-menu). For example, the field for the details 118 may be used to indicate that the displayed context menu items 116 belong to a sub-menu for an earlier selection, and a corresponding visual indicator (e.g., a pop-up item) may optionally be shown on the display screen 104. The context sub-menu can be implemented with a context sub-selector that is typically the same area of the touchscreen 108 as the context selector 120.

Figure 3:
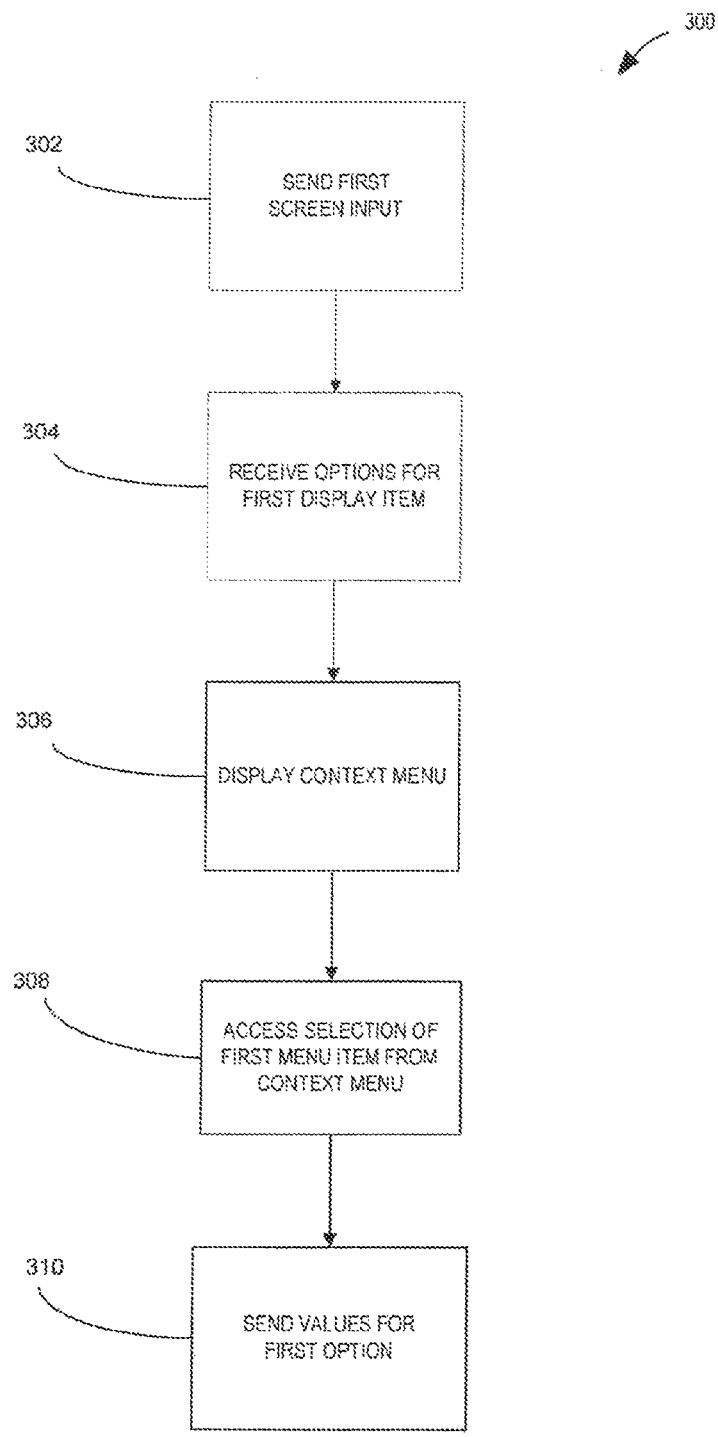
FIG. 3 is a flowchart that shows a method of using a tablet device to provide contextual input to a computing device according to an example embodiment.

FIG. 3 is flowchart that shows a method 300 of using a tablet device 106 to provide contextual input to a computing device 102 according to an example embodiment. A first operation 302 includes sending from the tablet device 106 to the computing device 102 a first screen input that identifies a first location on a display screen 104 of the computing device 102. For example, the first location on the display screen 104 may be the location of a cursor 112 on the display screen 104. A second operation 304 includes receiving at the tablet device 106 from the computing device 102 values that identify one or more options for a first display item on the display screen 104, with the first display hem being near the first location on the display screen 104. For example, the first display item may be the display item 114 nearest the cursor 112 on the display screen 104.

A third operation 306 includes displaying at a touchscreen 108 of the tablet device 106 a context menu that includes selectable areas for one or more menu items and a context selector, with the one or more menu items corresponding to the one or more options for the first display item and the context selector operating to indicate a selection from the context menu. For example, the one or more menu items may be represented separately as context menu items 116 on the touchscreen 108. A fourth operation 308 includes accessing at the tablet device 106 a selection of a first menu item from the content menu on the touchscreen 108, with the first menu item corresponding to a first option from die one or more options for the first display item. A fifth operation 310 includes sending from the tablet device 106 to the computing device 102 values for the first option for the first display item. (Note that words such as first and second are used here and elsewhere for labeling purposes only and are not intended to denote any specific spatial or temporal ordering. Furthermore, the labeling of a first element does not imply the presence a second element.)

As discussed above with respect to FIG. 1, the first screen input may be accessed from the touchscreen 108 to identify the first location (e.g., cursor location) of the display screen 106 when the context selector 120 is not employed. Additional operations related to touchpad functions may also be performed when the context selector 120 is not employed including changing the size or location of a display item on the display screen 104. In this way embodiments enable the user to employ a special gesture (e.g., simultaneously activating the context selector 120 and the context menu items 116) in order to switch from touchpad operations to context-menu operations.

Figure 4:
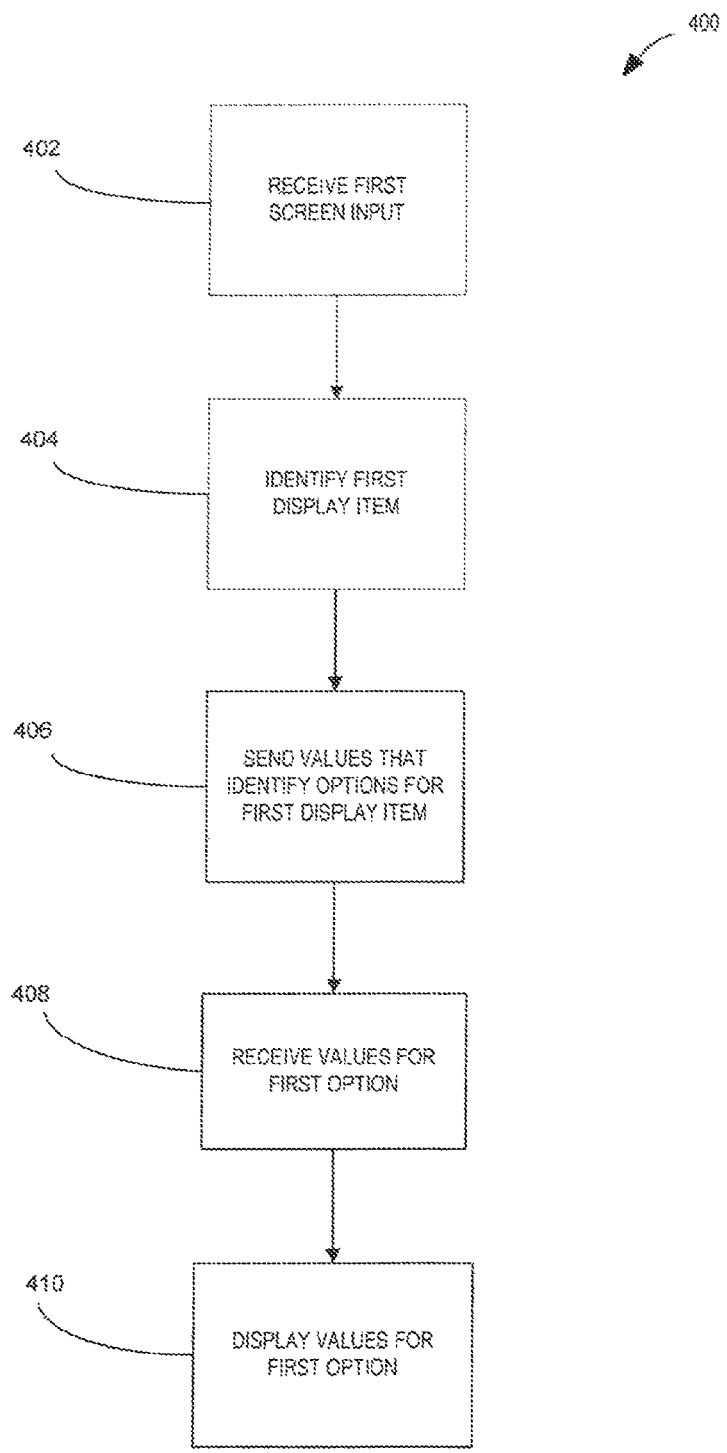
FIG. 4 is a flowchart that shows a method of using a tablet device to provide contextual input to a computing device according to another example embodiment.

The operations shown in FIG. 3 may be carried out at the tablet device 106 while related operations are carried out at the computing device 102. For example, FIG. 4 is flowchart that shows a related method 400 of using a tablet device 106 to provide contextual input to a computing device 102 according to an example embodiment where operations may be carried out at the computing device 102. A first operation 402 includes receiving at the computing device 102 from the tablet device 106 the first screen input that identifies the first location on the display screen 104. A second operation 404 includes identifying at the computing device 102 the first display item on the display screen 104, with the first display item being within a threshold distance from the first location on the display screen 104 and at least one option being associated with the first display item.

A third operation 406 includes sending from the computing device 102 to the tablet device 106 the values that identity the one or more options for the first display item. A fourth operation 408 includes receiving at the computing device 102 from the tablet device 106 the values for the first option for the first display item. A fifth operation 410 includes displaying one or more of the values for the first option at the display screen 104 of the computing device 102.

Additional embodiments correspond to systems and related computer programs that carry out the above-described methods.

Figure 5:
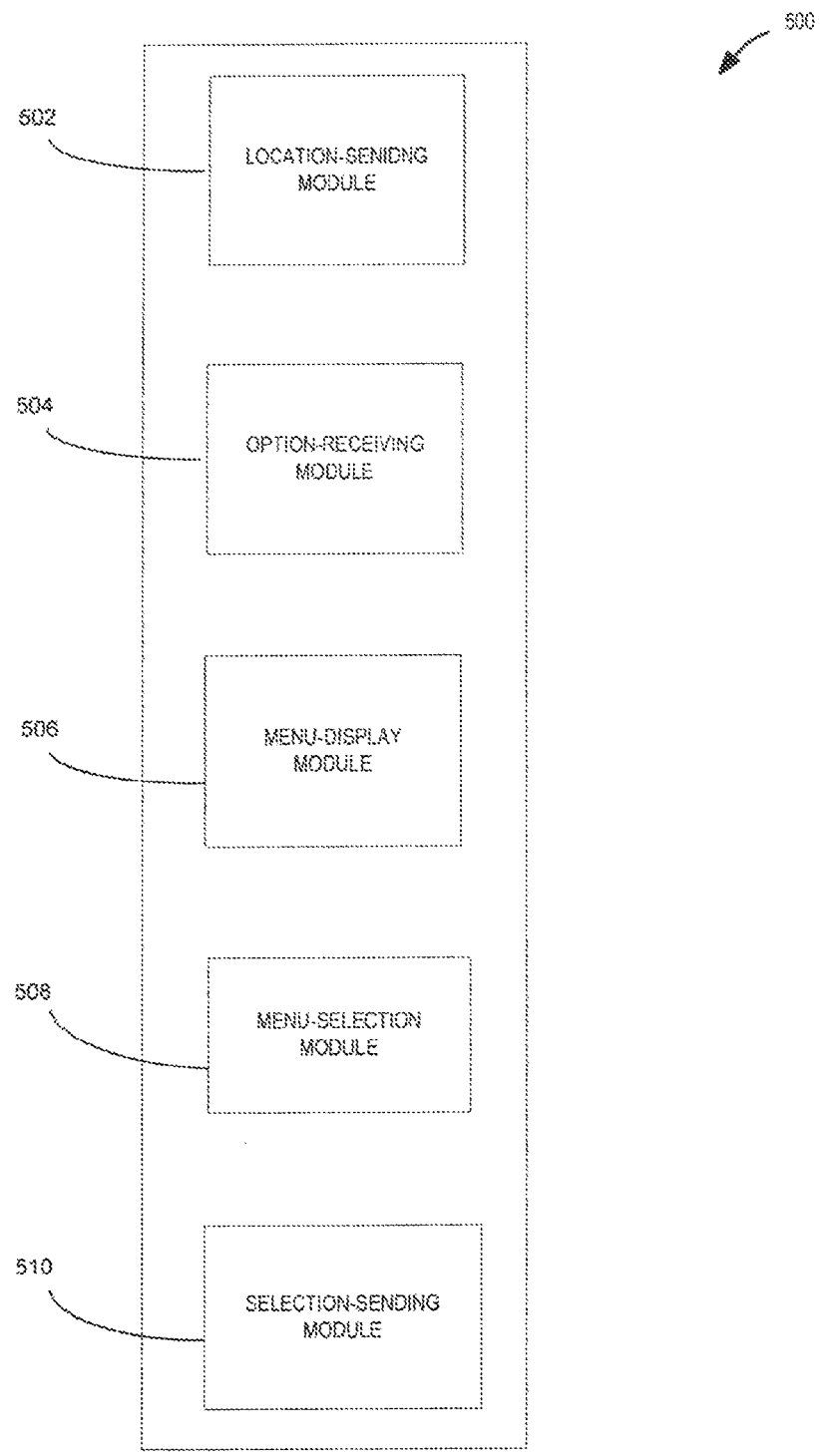
FIG. 5 is a block diagram that shows a schematic representation of an apparatus for an example embodiment related to the embodiment of FIG. 3.

FIG. 5 shows a schematic representation of an apparatus 500 in accordance with an example embodiment related to operations at the tablet device 106. In this case, the apparatus 500 includes at least one computer system (e.g., as in FIG. 7) to perform software and hardware operations for modules that carry out aspects of the method 300 of FIG. 3. The apparatus 500 includes a location-sending-module 502, an option-receiving module 504, a menu-display module 506, a menu-selection module 508, and a selection-sending module 510.

The option-receiving module 504 receives at the tablet device 106 from the computing device 102 values that identify one or more options for a first display item on the display screen 104, with the first display item being near the first location on the display screen 104. The menu-display module 506 displays at a touchscreen 108 of the tablet device 106 a context menu that includes selectable areas for one or more menu items and a context selector, with the one or more menu items corresponding to the one or more options for the first display item and the context selector operating to indicate a selection from the context menu. The menu-selection module 508 accesses at the tablet device 106 a selection of a first menu item from the content menu on the touchscreen 108, with the first menu item corresponding to a first option from the one or more options for the first display item. The selection-sending module 510 sends from the tablet device 106 to the computing device 102 values for the first option for the first display item.

Figure 6:
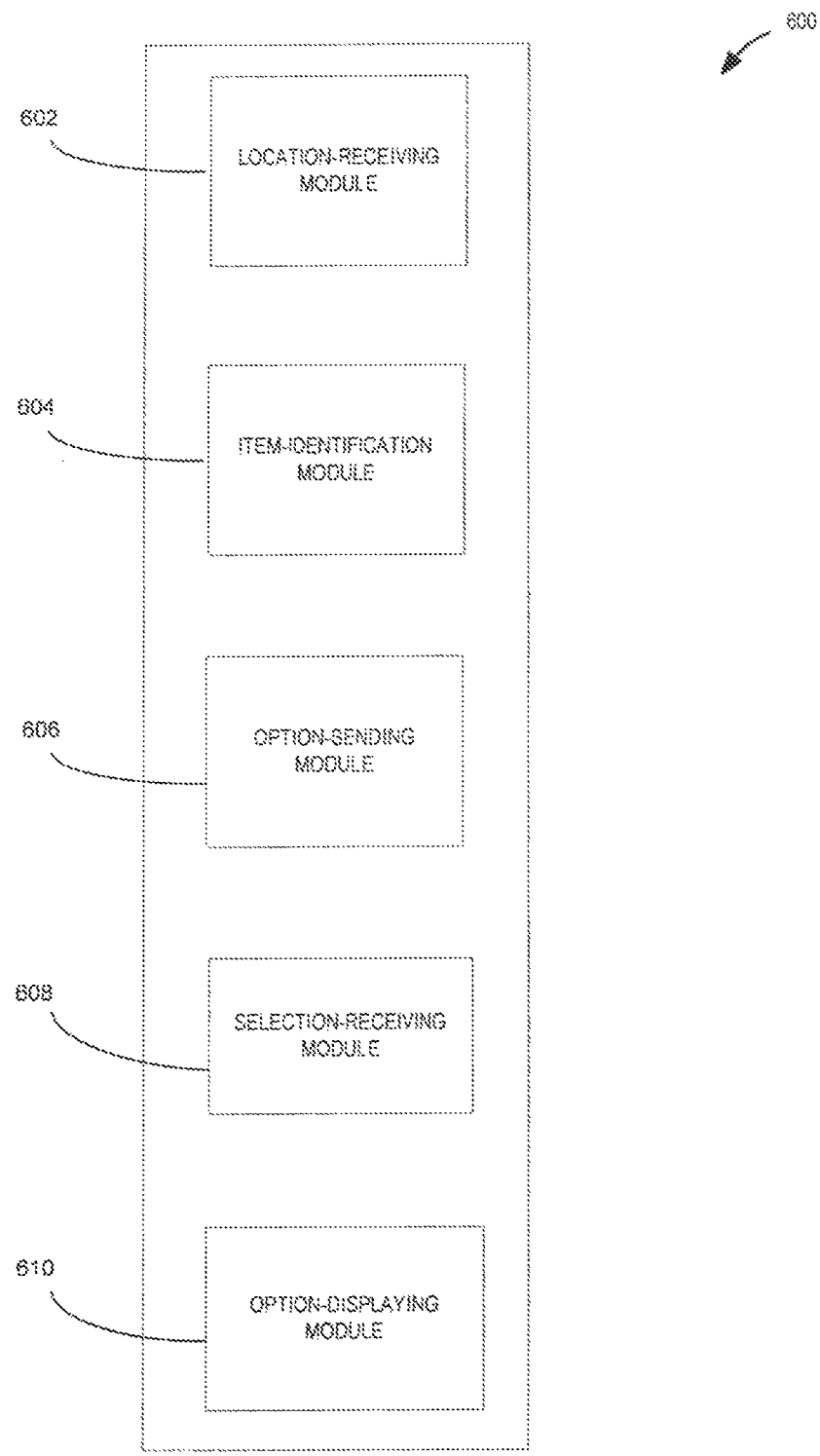
FIG. 6 is a block diagram that shows a schematic representation of an apparatus for an example embodiment related to the embodiment of FIG. 4.

FIG. 6 shows a schematic representation of an apparatus 600 in accordance with an example embodiment related to operations at the computing device 102. In this case, the apparatus 600 includes at least one computer system (e.g., as in FIG. 7) to perform software and hardware operations for modules that carry out aspects of the method 400 of FIG. 4. The apparatus 600 includes a location-receiving module 602, an item-identification module 604, an option-sending module 606, a selection-receiving module 608, and an option-displaying module 610.

The location-receiving module 602 receives at the computing device 102 from the tablet device 106 the first screen input that identifies the first location on the display screen 104. The item-identification module 604 identifies at the computing device 102 the first display item on the display screen 104, with the first display item being within a threshold distance from the first location on the display screen, and at least one option being associated with the first display item. The option-sending module 606 sends from the computing device 102 to the tablet device 106 the values that identify the one or more options for the first display item. The selection-receiving module 608 receives at the computing device 102 from the tablet device 106 the values for the first option for the first display item. The option-displaying module 610 displays one or more of the values for the first option at the display screen 104 of the computing device 102.

Figure 7:
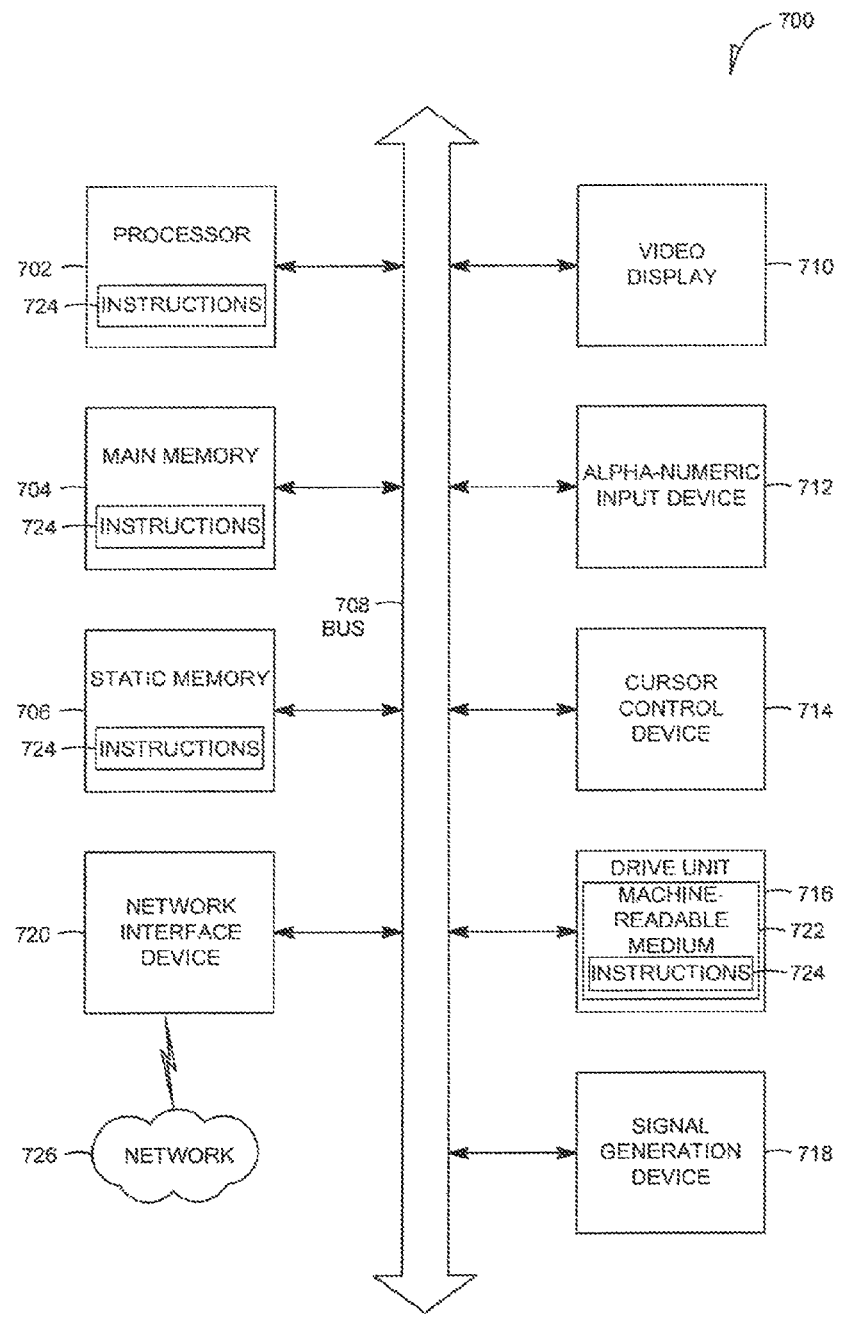
FIG. 7 is a block diagram that shows a computer processing system within which a set of instructions for causing the computer to perform any one of the methodologies discussed herein may be executed.

FIG. 7 shows a machine in the example form of a computer system 700 within which instructions for causing the machine to perform any one or more of the methodologies discussed here may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential, or otherwise) that specify actions to be taken by that machine. Further, while only a single machine is illustrated, the term "machine" shall also be taken to include any collection of machines mat individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

In some contexts, a computer-readable medium may be described as a machine-readable medium. The disk drive unit 716 includes a machine-readable medium 722 on which is stored one or more sets of data structures and instructions 724 (e.g., software) embodying or utilizing any one or more of the methodologies or functions described herein. The instructions 724 may also reside, completely or at least partially, within the static memory 706, within the main memory 704, or within the processor 702 during execution thereof by the computer system 700, with the static memory 706, the main memory 704, and the processor 702 also constituting machine-readable media.

While fee machine-readable medium 722 is shown in an example embodiment to be a single medium, the terms "machine-readable medium" and "computer-readable medium" may each refer to a single medium or multiple media (e.g., a centralized or distributed database, and/or associated caches and servers) that store the one or more sets of data structures and instructions 724. These terms shall also be taken to include any tangible or non-transitory medium that is capable of storing, encoding or carrying instructions for execution by the machine and that cause the machine to perform any one or more of the methodologies disclosed herein, or that is capable of storing, encoding, or carrying data structures utilized by or associated with such instructions. These terms shall accordingly be taken to include, but not be limited to, solid-state memories, optical media, and magnetic media. Specific examples of machine-readable or computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; compact disc read-only memory (CD-ROM) and digital versatile disc read-only memory (DVD-ROM).

The instructions 724 may further be transmitted or received over a communications network 726 using a transmission medium. The instructions 724 may be transmitted using the network interface device 720 and any one of a number of well-known transfer protocols (e.g., hypertext transfer protocol (HTTP)). Examples of communication networks include a local area network (LAN), a wide area network (WAN), the internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module (e.g., a computer-implemented module) may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable, processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" (e.g., a "computer-implemented module") should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented, modules may also initiate communications with input or output devices and may operate on a resource (e.g., a collection of information).

The various operations of example methods described herein may be performed, at least partially, by one or more processors that are temporarily configured (e.g., by software) or permanently configured to perform, the relevant operations. Whether temporarily or permanently configured, such processors may constitute processor-implemented modules that operate to perform one or more operations or factions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, hut deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method of using a tablet device to provide contextual input to a computing device, the method comprising:
   sending from the tablet device to the computing device a first screen input that identifies a first location on a display screen of the computing device;
   receiving at the tablet device from the computing device values that identify one or more options for a first display item on the display screen, the first display item being near the first location on the display screen;
   displaying at a touchscreen of the tablet device a context menu that includes selectable areas for one or more menu items and a context selector, the one or more menu items corresponding to the one or more options for the first display item, and the context selector operating to indicate a selection from the context menu;
   if the context selector is selected on the touchscreen of the tablet device, accessing at the tablet device a selection of a first menu item from the content menu on the touchscreen, the first menu item corresponding to a first option from the one or more options for the first display item, and sending from the tablet device to the computing device values for the first option for the first display item; and
   if the context selector is not selected on the touchscreen of the tablet device, sending from the tablet device to the computing device values that change a size or location of at least one display item on the display screen of the computing device.

2. The method of claim 1, further comprising:
   receiving at the computing device from the tablet device the first screen input that identifies the first location on the display screen;
   identifying at the computing device the first display item on the display screen, the first display item being within a threshold distance from the first location on the display screen, and at least one option being associated with the first display item;
   sending from the computing device to the tablet device the values that identify the one or more options for the first display item;
   receiving at the computing device from the tablet device the values for the first option for the first display item; and
   displaying one or more of the values for the first option at the display screen of the computing device.

3. The method of claim 1, further comprising:
   accessing values for the first screen input from the touchscreen of the tablet device.

4. The method of claim 1, further comprising:
   providing a wireless connection between the computing device and the tablet device, the wireless connection supporting operations for sending and receiving values between the computing device and the tablet device.

5. The method of claim 1, further comprising:
   in response to receiving the values that identify the one or more options for the first display item on the display screen, providing a non-visual signal at the tablet device, the non-visual signal including at least one of a sound or a vibration.

6. The method of claim 1, further comprising:
   receiving at the tablet device from the computing device values that identify one or more sub-options for the first option for the first display item;
   displaying at the touchscreen of the tablet device a context sub-menu that includes selectable areas for one or more sub-menu items and a context sub-selector, the one or more sub-menu items corresponding to the one or more sub-options for the first option, and the context sub-selector operating to indicate a selection from the context sub-menu;
   accessing at the tablet device a selection of a first sub-menu item from the context sub-menu on the touchscreen, the first sub-menu item corresponding to a first sub-option from the one or more sub-options for the first option; and sending from the tablet device to the computing device values for the first sub-menu item corresponding to the first sub-option for the first option.

7. The method of claim 1, wherein the values that identify the one or more options for the first display item include values for a graphical image of the first display item, and the context menu includes the graphical image of the first display item.

8. The method of claim 1, wherein the context menu is arranged on the touchscreen so that a first digit of a hand selects the context selector and a second digit of the hand selects the first menu item.

9. The method of claim 1, wherein the context menu includes a plurality of menu items that are approximately arranged along an arc that is defined about the context selector on the touchscreen.

10. The method of claim 1, wherein the context menu includes a plurality of menu items that are approximately arranged along an arc that is defined about the context selector on the touchscreen, the context menu being arranged on the touchscreen so that a first digit of a hand selects the context selector and a second digit of the hand selects the first menu item; and the values for the first option for the first display item are sent to the computing device in response to a simultaneous activation of the context selector and the first menu item through touchscreen operations at the tablet device.

11. A non-transitory computer-readable medium that stores a computer program for using a tablet device to provide contextual input to a computing device, the computer program including instructions that, when executed by at least one computer, cause the at least one computer to perform operations comprising:

sending from the tablet device to the computing device a first screen input that identifies a first location on a display screen of the computing device;

receiving at the tablet device from the computing device values that identify one or more options for a first display item on the display screen, the first display item being near the first location on the display screen;

displaying at a touchscreen of the tablet device a context menu that includes selectable areas for one or more menu items and a context selector, the one or more menu items corresponding to the one or more options for the first display item, and the context selector operating to indicate a selection from the context menu;

accessing at the tablet device a selection of a first menu item from the content menu on the touchscreen, the first menu item corresponding to a first option from the one or more options for the first display item; and sending from the tablet device to the computing device values for the first option for the first display item;

if the context selector is selected on the touchscreen of the tablet device, accessing at the tablet device a selection of a first menu item from the content menu on the touchscreen, the first menu item corresponding to a first option from the one or more options for the first display item, and sending from the tablet device to the computing device values for the first option for the first display item; and if the context selector is not selected on the touchscreen of the tablet device, sending from the tablet device to the computing device values that change a size or location of at least one display item on the display screen of the computing device.

12. The non-transitory computer-readable medium of claim 11, wherein the computer program further includes instructions that, when executed by the at least one computer, cause the at least one computer to perform operations comprising: receiving at the computing device from the tablet device the first screen input that identifies the first location on the display screen; identifying at the computing device the first display item on the display screen, the first display item being within a threshold distance from the first location on the display screen, and at least one option being associated with the first display item; sending from the computing device to the tablet device the values that identify the one or more options for the first display item; receiving at the computing device from the tablet device the values for the first option for the first display item; and displaying one or more of the values for the first option at the display screen of the computing device.

13. The non-transitory computer-readable medium of claim 11, wherein the computer program further includes instructions that, when executed by the at least one computer, cause the at least one computer to perform operations comprising: accessing values for the first screen input from the touchscreen of the tablet device.

14. The non-transitory computer-readable medium of claim 11, wherein the computer program further includes instructions that, when executed by the at least one computer, cause the at least one computer to perform operations comprising: providing a wireless connection between the computing device and the tablet device, the wireless connection supporting operations for sending and receiving values between the computing device and the tablet device.

15. The non-transitory computer-readable medium of claim 11, wherein the computer program further includes instructions that, when executed by the at least one computer, cause the at least one computer to perform operations comprising: in response to receiving the values that identify the one or more options for the first display item on the display screen, providing a non-visual signal at the tablet device, the non-visual signal including at least one of a sound or a vibration.

16. The non-transitory computer-readable medium of claim 11, wherein the computer program further includes instructions that, when executed by the at least one computer, cause the at least one computer to perform operations comprising: receiving at the tablet device from the computing device values that identify one or more sub-options for the first option for the first display item; displaying at the touchscreen of the tablet device a context sub-menu that includes selectable areas for one or more sub-menu items and a context sub-selector, the one or more sub-menu items corresponding to the one or more sub-options for the first option, and the context sub-selector operating to indicate a selection from the context sub-menu; accessing at the tablet device a selection of a first sub-menu item from the context sub-menu on the touchscreen, the first sub-menu item corresponding to a first sub-option from the one or more sub-options for the first option; and sending from the tablet device to the computing device values for the first sub-menu item corresponding to the first sub-option for the first option.

17. The non-transitory computer-readable medium of claim 11, wherein the values that identify the one or more options for the first display item include values for a graphical image of the first display item, and the context menu includes the graphical image of the first display item.

18. The non-transitory computer-readable medium of claim 11, wherein the context menu is arranged on the touchscreen so that a first digit of a hand selects the context selector and a second digit of the hand selects the first menu item.

19. The non-transitory computer-readable medium of claim 11, wherein the context menu includes a plurality of menu items that are approximately arranged along an arc that is defined about the context selector on the touchscreen.

20. A system for using a tablet device to provide contextual input to a computing device, the system comprising at least one computer configured at the tablet device to perform operations for computer-executable modules including:
   a location-sending module that sends from the tablet device to the computing device a first screen input that identifies a first location on a display screen of the computing device;
   an option-receiving module that receives at the tablet device from the computing device values that identify one or more options for a first display item on the display screen, the first display item being near the first location on the display screen;
   a menu-display module that displays at a touchscreen of the tablet device a context menu that includes selectable areas for one or more menu items and a context selector, the one or more menu items corresponding to the one or more options for the first display item, and the context selector operating to indicate a selection from the context menu;
   a menu-selection module that accesses at the tablet device a selection of a first menu item from the content menu on the touchscreen, the first menu item corresponding to a first option from the one or more options for the first display item;
   a selection-sending module that sends from the tablet device to the computing device values for the first option for the first display item; and
   a control module that operates in a first mode if the context selector is not employed and that operates in a second mode if the context selector is employed, the first mode including operations for using the location-sending module to send from the tablet device to the computing device the first screen input that identifies the first location on the display screen of the computing device, and the second mode including operations for using the selection-sending module to send from the tablet device to the computing device the values for the first option for the first display item.

21. The system of claim 20, further comprising at least one computer configured at the computing device to perform operations for computer-executable modules including:
   a location-receiving module that receives at the computing device from the tablet device the first screen input that identifies the first location on the display screen;
   an item-identification module that identifies at the computing device the first display item on the display screen, the first display item being within a threshold distance from the first location on the display screen, and at least one option being associated with the first display item;
   an option-sending module that sends from the computing device to the tablet device the values that identify the one or more options for the first display item;
   a selection-receiving module that receives at the computing device from the tablet device the values for the first option for the first display item; and
   an option-displaying module that displays one or more of the values for the first option at the display screen of the computing device.

22. The system of claim 20, wherein the first mode of the control module further includes operations for sending to the computing device the values that change the size or location of the at least one display item on the display screen of the computing device.

23. The system of claim 20, wherein the context menu includes a plurality of menu items that are approximately arranged along an arc that is defined about the context selector on the touchscreen, the context menu being arranged on the touchscreen so that a first digit of a hand selects the context selector and a second digit of the hand selects the first menu item.

* * * * *